United States Patent [19]

Murray

[11] 4,202,812

[45] May 13, 1980

[54] SILICONE RUBBER COMPOSITIONS CONTAINING EXTENDING FILLERS AND ACRYLOXYALKYLSILANES

[75] Inventor: Milton C. Murray, Bay City, Mich.

[73] Assignee: Dow Corning Corporation, Midland, Mich.

[21] Appl. No.: 939,037

[22] Filed: Sep. 1, 1978

[51] Int. Cl.² ............................................. C08L 83/04
[52] U.S. Cl. .............................................. 260/37 SB
[58] Field of Search ........................ 260/37 SB, 42.15

[56] References Cited

U.S. PATENT DOCUMENTS

| | | | |
|---|---|---|---|
| 3,258,477 | 6/1966 | Plueddemann et al. | 260/37 SB |
| 3,341,489 | 9/1967 | Simpson | 260/37 SB |
| 3,555,051 | 1/1971 | Marsden et al. | 260/42.15 |
| 3,567,497 | 3/1971 | Plueddemann et al. | 260/40 R |
| 3,817,910 | 6/1974 | Viksne | 260/37 SB |

OTHER PUBLICATIONS

Union Carbide; Silane Coupling Agents in Mineral-Reinforced Elastomers; 9/77.

*Primary Examiner*—Lewis T. Jacobs
*Attorney, Agent, or Firm*—Roger H. Borrousch; Edward C. Elliott

[57] ABSTRACT

Acryloxyalkylsilanes added to silicone rubber compositions extended with siliceous extending fillers makes compositions which cure to elastomers with improved tensile strength.

8 Claims, No Drawings

4,202,812

SILICONE RUBBER COMPOSITIONS CONTAINING EXTENDING FILLERS AND ACRYLOXYALKYLSILANES

BACKGROUND OF THE INVENTION

1. Field of the Invention

This invention relates to elastomeric polydiorganosiloxane compositions using extending type fillers.

2. Description of the Prior Art

Elastomeric polydiorganosiloxane compositions are commercially available as fully compounded stocks and as bases which are further compounded by the addition of materials such as catalyst, pigments, and extending fillers. When extending fillers are added, the tensile strength of the cured composition is lowered. Part of the lost strength may be recovered by post-curing the composition.

In U.S. Pat. No. 3,341,489, Simpson discloses that if a certain olefinically unsaturated organosilicon material, such as vinyltriethoxysilane, is employed in minor amounts in an organopolysiloxane composition convertable to the cured, solid, elastic state, the resulting composition can be directly fabricated to valuable elastomeric products without the necessity of an extended post-cure. The olefinically unsaturated organosilicon material is selected from a silane having the formula,

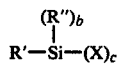

and a cyclic siloxane ester having the formula,

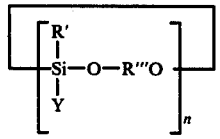

where R' is an olefinically unsaturated monovalent hydrocarbon radical, R" is a member selected from hydrogen, and monovalent hydrocarbon radicals free of olefinic unsaturation, R''' is a divalent aliphatic radical, X is a member selected from alkoxy radicals, alkoxyalkoxy radicals, alkoxyaryloxy radicals, acyloxy radicals, and halogen radicals, Y is a member selected from R" and X radicals, b is a whole number equal to from 0 to 2 inclusive, c is an integer equal to from 1 to 3 inclusive, and the sum of b and c is equal to 3, and n is an integer equal to from 1 to 10, and preferably from 1 to 3 inclusive. The invention is practiced by forming a mixture of the polymer, filler, and organosilanes; the order of addition is not critical.

There is no teaching in the above patent that an acryloxyalkylsilane will increase the tensile strength of a compound made with an extending filler such as ground silica and a silicone rubber base.

In U.S. Pat. No. 3,567,497, Plueddemann and Clark teach the use of an acryloxyalkylsilane with a polymerizable vinylic resin and a base member to produce a composite article of superior strength. They teach that all siliceous materials including clay, diatomaceous earth, and ground quartz are useful in their invention. The vinylic resins described as of greatest interest are styrene, acrylic, methacrylic, and polyester resins; and butadiene-styrene copolymers.

The preferred method of use is to wet the surface of the base member with an aqueous solution of a hydrolysate of the defined silane, then allowing the surface to dry to yield a treated base member.

They teach that the treated materials of their invention can also be incorporated into natural polyolefinic rubber articles. Other types of rubbery materials which can be employed are organosiloxane rubbers which contain at least some silicon atoms to which are attached unsaturated aliphatic radicals.

Although the acryloxyalkylsilane of the instant invention is taught by Plueddmann and Clark, they do not teach the instant invention. They teach the addition of an acryloxyalkylsilane to a vinylic resin and thereafter applying the mixture to a base member or filler.

It is known that silanes containing vinyl and methacryl functionality may be used with mineral-filled peroxide-cured elastomers including EPR, EPDM, silicone elastomers, and crosslinkable polyethylene. It is broadly taught that the use of silanes at concentrations ranging from less than 0.5 parts by weight per hundred filler to levels above 2.0 parts by weight per hundred filler improve the performance of relatively inexpensive extending fillers, including ground silica, calcined and hydrous clay, talc, wollastonite, alumina trihydrate, calcium carbonate, and titanium dioxide.

SUMMARY OF THE INVENTION

This invention relates to silicone rubber bases with fillers added to lower their cost. It has now been discovered that by adding certain acryloxyalkylsilanes to a silicone ruber base along with siliceous extending filler, such as ground quartz or diatomaceous earth, the loss of tensile strength ordinarily caused by the addition of extending filler can be partially or completely overcome. This discovery allows the lowering of the cost of silicone rubber compositions without a loss of physical properties.

The use of acryloxyalkylsilane in silicone rubber composition which has been extended by the addition of filler yields a cured product with optimum properties after being press-cured. It is not necessary to post-cure the product to obtain optimum properties.

DESCRIPTION OF THE INVENTION

This invention relates to a composition comprising (a) 100 parts by weight of silicone rubber base consisting essentially of polydiorganosiloxane wherein the organic radicals are selected from the group consisting of methyl, vinyl, phenyl, and 3,3,3-trifluoropropyl, reinforcing silica filler, and anti-crepe hardening agent, (b) from 25 to 300 parts by weight of siliceous extending filler with an average particle size of less than 25 micrometers and a surface area of less than 50 m²/g, (c) from 0.1 to 5 parts by weight of organic peroxide vulcanizing agent suitable for vulcanizing the silicone rubber base, (d) from 0.08 to 0.3 part by weight of an acryloxyalkylsilane of the formula

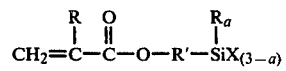

in which R is selected from the group consisting of hydrogen and methyl radical, R' is an alkylene radical of from 1 to 4 inclusive carbon atoms, X is a radical selected from the group consisting of lower alkoxy radicals of from 1 to 3 inclusive carbon atoms and acetoxy radical, and a is from 0 to 2 inclusive.

The silicone rubber base used in the present invention can be any mixture of polydiorganosiloxane and reinforcing silica filler of the types commercially available. The polydiorganosiloxane of this invention contains organic radicals selected from the group consisting of methyl, vinyl, phenyl, and 3,3,3-trifluoropropyl, said radicals being bonded to the silicon atoms of the polydiorganosiloxane. The polydiorganosiloxanes are commonly of a viscosity of from 1000 Pa·s up to and including non-flowing gums. These polydiorganosiloxanes are well known in the art and are commercially available.

A silicone rubber base contains a reinforcing silica filler to improve the physical strength of the polymer. Reinforcing silica fillers have a surface area of from 150 to greater than 400 m$^2$/g. These reinforcing silica fillers are well known in the art and can be obtained commercially. The reinforcing filler can be untreated, treated, or treated in situ during the manufacture of the silicone rubber base. The treated reinforcing silica fillers can be treated by any of the conventional methods described in the prior art, wherein the treating agents include organosilanes, organosiloxanes, and silazanes. The amount of reinforcing filler can vary from 10 to as much as 100 parts by weight with the usual amount varying between 15 to 75 parts by weight per 100 parts by weight of the polydiorganosiloxane.

A silicone rubber base can also contain anti-crepe hardening agents. These anti-crepe hardening agents are used to reduce the reaction between the polydiorganosiloxane and the reinforcing silica that causes the base to become harder or pseudo-vulcanized. Such a reaction can cause the base to become too "nervy" to be of further use.

Suitable anti-crepe hardening agents are well known in the art. They can be such additives as hydroxyl endblocked short chain polydimethylsiloxane fluids. If the reinforcing filler is treated as discussed above, the silicone rubber base may not need an additional anti-crepe hardening agent.

The silicone rubber base may also contain minor amounts of additives to improve the heat stability, handling, compression set, oil resistance, etc. A single silicone rubber base may be used or a mixture of bases may be used to obtain the desired range of physical properties for the cured silicone rubber.

In use, a silicone rubber base may be extended with an extending filler to increase the bulk of the composition. This helps to lower the cost of the finished part as the extending fillers are much lower in cost than the silicone rubber base. When a silicone rubber base is extended with an extending filler such as ground quartz, the tensile strength of the cured composition is much lower than that of the beginning base. The amount of tensile strength lost is dependent upon the relative amounts of base and extending filler used as well as the exact nature of both ingredients. If the mixture of silicone rubber base and extending filler is vulcanized and then given an oven post-cure, it is possible to restore a portion of the tensile strength loss due to the extending filler, but the oven post-cure is a separate and costly additional process. In some cases, as in insulating electrical wiring by an extrusion process, it is not practical to subject the cured product to an oven post-cure. It is a purpose of the present invention to eliminate a major portion of this tensile strength drop by the lowest cost means.

The siliceous extending fillers of this invention used with silicone rubber bases are finely ground particles of heat stable inorganic materials with an average particle size of under 25 micrometers. The finest extending fillers approach a particle size and configuration such that they they have a surface area of as high as 50 m$^2$/g. Examples of siliceous extending fillers useful in this invention include ground quartz, diatomaceous earth, and glass.

About 25 parts by weight of extending filler per 100 parts by weight of silicone rubber base is necessary to significantly lower the cost of the composition. As much as 300 parts by weight of some extending fillers may be used where the lowest cost is necessary. A preferred level of extending filler is from 25 to 200 parts by weight. The preferred siliceous extending fillers of the present invention are ground quartz and diatomaceous earth with the most preferred filler being ground quartz with an average particle size of about 5 micrometers.

The composition of this invention contains an organic peroxide vulcanizing agent suitable for vulcanizing the polydiorganosiloxane in the silicone rubber base. If the polydiorganosiloxane does not contain any vinyl radicals, it must be vulcanized with organic peroxides that are efficient in causing reactions in such polydiorganosiloxanes. Such organic peroxides are labeled "non-vinyl specific" and are represented by such organic peroxides as benzoylperoxide, dicumylperoxide, and 2,4-dichlorobenzoylperoxide. If the polydiorganosiloxane contains vinyl radicals, it can be vulcanized with either "non-vinyl specific" or "vinyl specific" organic peroxides. Representative of the vinyl specific organic peroxides are ditertiary-butylperoxide and 2,5-bis-(tert-butylperoxy)-2,5-dimethylhexane. All these organic peroxide vulcanizing agents and their properties are well known in the art. The properties of the cured silicone rubber can be altered by the type and amount of vulcanizing agent used to cure the composition. Typical changes due to such choices are well recognized in the art. The vulcanizing agent can be present in amounts of from 0.1 to 5 parts by weight per 100 parts by weight of silicone rubber base, preferably from 0.5 to 2.0 parts by weight.

The critical component of the composition of this invention is an acryloxyalkylsilane of the formula

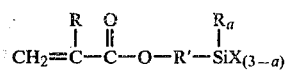

in which R is selected from the group consisting of hydrogen and methyl radical, R' is an alkylene radical of from 1 to 4 inclusive carbon atoms, X is a radical selected from the group consisting of lower alkoxy radicals of from 1 to 3 inclusive carbon atoms and acetoxy radical, and a is from 0 to 2 inclusive. The silane is preferred where R is a methyl radical, a is 0, and X is a methoxy radical or acetoxy radical. The most preferred silane is gamma-methacryloxypropyltrimethoxysilane because of its efficiency in restoring the tensile strength to a silicone rubber base that has been extended with a siliceous extending filler and also because of the commercial availability of this silane.

The acryloxyalkylsilanes used in this invention are known in the art. They are disclosed in U.S. Pat. No.

3,567,497 by Plueddemann and Clark which is hereby enclosed by reference to further describe the silanes and their method of manufacture. The preferred gamma-methacryloxypropyltrimethoxysilane is commercially available.

As little as 0.08 parts by weight of silane per 100 parts by weight of silicone rubber base can be enough to show a significant effect on the tensile strength of the cured composition.

Tests have indicated that at 0.5 parts by weight of the silane per 100 parts by weight of the silicone rubber base, the cured composition can adhere to the aluminum plates used in the molding process even though the plates have been coated with a release agent. For this reason the practical upper limit for a composition used in a molding process is 0.3 parts by weight of the silane per 100 parts by weight of the silicone rubber base. The most preferred level of silane is dependent upon the nature of the other ingredients of the composition and their amounts. The most preferred level may be easily determined by simple experimentation.

The composition of this invention is prepared by any suitable means that will lead to a homogeneous mixture of the several components. Methods of mixing that are common in the silicone rubber art and which are suitable for this invention include mixing with a dough mixer, a rubber compounding mill, or with a Banbury mixer. The order of mixing is not critical. Ordinarily the silicone rubber base is placed in the mixer, the extending filler and silane are added and mixed until homogeneous, then the vulcanizing agent is added and mixing continued until homogeneous. Any additional additives such as heat stability additives, antioxidants, processing aids, pigments, etc. would ordinarily be added before the vulcanizing agent.

The curable homogeneous compositions of this invention can be cured by any suitable means that will cause decomposition of the organic-peroxide vulcanizing agent. Heating is the preferred method. The time and temperature necessary to cause vulcanization of the composition are dependent upon the organic peroxide vulcanizing agent chosen, the method of heating, the method of shaping the composition to the desired configuration, and the thickness of the part. The temperature that is appropriate for a given set of conditions is well known in the silicone rubber art. Typical temperatures are from 110° C. to 175° C. for molding operations to as high as 300° C. for the ovens used in continuous hot air vulcanization operations.

The compositions can be shaped to the desired configuration by any of the well known methods of forming elastomeric curable compositions such as press molding, injection molding, calendering, and extruding, both supported and unsupported.

When a silicone rubber base is extended with a low cost extending filler to lower the cost of the resulting composition, the tensile strength of the vulcanized silicone rubber is normally lower than that of the unextended silicone rubber base. If the vulcanized rubber is subjected to an oven post-cure, it is possible to increase the tensile strength. Such a post-cure is commonly of from 1 to 24 hours duration at a temperature of from 150° C. to 250° C. This oven curing is an expensive step in the process of making silicone rubber parts. If the parts being made are formed by a continuous extrusion process such as for making tubing or insulated electrical wiring, the post-cure step becomes even more difficult and expensive. It was found that compositions of this invention had properties after a simple vulcanization step that were equivalent to those that were only achieved by post-curing if the silane was not present.

The compositions of this invention are useful for making elastomeric articles suitable for uses customarily known for silicone rubber such as molded parts for high temperature applications, gaskets, O-rings, diaphragms, tubing, and insulated electrical wiring. Equivalent products can be produced at a lower cost when compositions of this invention are used.

The following examples are included for illustrative purposes only and should not be construed as limiting the invention which is properly delineated by the appended claims. All parts are parts by weight.

EXAMPLE 1

A series of stocks were prepared and their physical properties measured to illustrate the instant invention.

A. A commercially available silicone rubber designed for use in compounding general purpose silicone rubber stocks was used. The base was translucent with a specific gravity after molding of 1.09. The base consisted of a vinyl containing polydimethylsiloxane, a reinforcing fume silica, and a hydroxyl endblocked polydimethylsiloxane fluid to prevent the crepe aging of the base.

The properies of the base after curing were determined by mixing 100 parts of the base with 1 part of organic peroxide vulcanizing agent to make a catalyzed base. The vulcanizing agent was 50 weight percent 2,5-bis-(tert-butylperoxy)-2,5-dimethylhexane dispersed on an inert carrier powder. The catalyzed base was molded into a 1.9 mm thick test slab, molding for 10 minutes at 170° C. in a press. The physical properties of the test slab were determined in accordance with the procedures described by ASTM-412 for tensile strength and elongation, by ASTM-D625, Die B for tear strength, and by ASTM-D2240 for durometer, type A. The measured physical properties were as shown in Table I in which the tensile strength is recorded in megapascals (MPa) and the tear strength is recorded in kilonewtons per meter (kN/m).

B. The test slab of A was post-cured for 1 hour at 250° C. in an air circulating oven. The physical properties were then measured to show the effect of post-curing the test slab. The properties were as shown in Table I.

C. The silicone rubber base of A was compounded into a stock by mixing on a 2-roll mill, 100 parts by base, 100 parts of a ground quartz filler with an average particle size of 5 micrometers, and 1 part of the vulcanizing agent of A. The stock was then molded into test slabs as in A and the physical properties measured as described in A. The properties were as shown in Table I.

A comparison of the tensile strength of A and C shows that the tensile strength of the vulcanized stock decreased when extending filler was added.

D. The test slab of C was post-cured for 1 hour at 250° C. The physical properties were then measured to show the effect of post-curing test slabs containing an extending filler. The properties were as shown in Table I. The tensile strength was increased by post-curing.

E. The stock of C was repeated with the addition of 0.1 part of gamma-methacryloxypropyltrimethoxysilane to the other ingredients. The silane was added to the base on a 2-roll mill, then the extending filler and vulcanizing agent were added. The stock was then molded into test slabs as in A and the physical properties measured as described in A. The results were as shown in Table I.

A comparison of the results of C with E shows that the addition of the gamma-methacryloxypropyltimethoxysilane increases the tensile strength of the vulcanized stock containing a large quantity of extending filler up to a value comparable to the tensile strength of the vulcanized base without the extending filler as shown by A.

F. The stock of E was repeated except the amount of silane was increased to 0.2 part. The results were as shown in Table I.

G. The stock of E was repeated except the amount of silane was increased to 0.25 part. The results were as shown in Table I.

H. The stock of E was repeated except the amount of silane was increased to 0.3 part. The results were as shown in Table I.

I. The stock of E was repeated except the amount of silane was increased to 0.5 part. The results were as shown in Table I. In order to obtain a good test slab at this level of silane, which is outside the scope of this invention, it was necessary to use polytetrafluoroethylene film as a release agent during the press molding process.

TABLE I

| Sample | Extending Filler | Silane | Durometer | Tensile Strength MPa | Elongation % | Tear Strength kN/m |
|---|---|---|---|---|---|---|
| A | none | none | 35 | 6.37 | 600 | 9.1 |
| B pc | none | none | 34 | 5.41 | 540 | 13.6 |
| C | 100 | none | 59 | 3.29 | 350 | 14.2 |
| D pc | 100 | none | 59 | 4.34 | 240 | 15.0 |
| E | 100 | 0.1 | 60 | 6.79 | 240 | 10.7 |
| F | 100 | 0.2 | 57 | 7.03 | 200 | 9.3 |
| G | 100 | 0.25 | 63 | 7.23 | 180 | 10.9 |
| H | 100 | 0.3 | 61 | 6.51 | 200 | 8.6 |
| I* | 100 | 0.5 | 62 | 6.89 | 180 | — | pc post-cured 1 hour at 250° C.
*outside the scope of this invention.

EXAMPLE 2

A series of stocks were prepared using different silanes.

J. A stock was prepared in accordance with E. This stock was then molded into test slabs as in A and the physical properties measured as described in A. The results were as shown in Table II.

K. The stock of J was prepared, substituting 0.1 part of (gamma-methacryloxypropyl)methyldimethoxysilane

for the silane of J. The properties measured are recorded in Table II.

L. The stock of J was prepared, substituting 0.1 part of (gamma-methacryloxypropyl)dimethylacetoxysilane

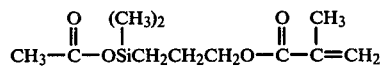

for the silane of J. The properties measured are recorded in Table II.

M. The stock of J was prepared, substituting 0.1 part of beta(vinylphenyl)ethyltrimethoxysilane

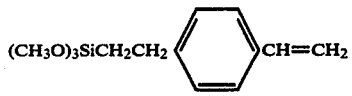

for the silane of J. This silane, which is outside the scope of the instant invention, was prepared by reacting divinylbenzene with trichlorosilane then distilling the product. The beta(vinylphenyl)ethyltrichlorosilane is then methoxylated to yield the above trimethoxysilane. The properties measured are recorded in Table II.

N. The stock of J was prepared, substituting 0.2 part of a solvent solution containing 50 weight percent of a reaction product of chloropropyltrimethoxysilane and dimethylaminoethylmethacrylate to yield a methacrylate functional silane of the formula

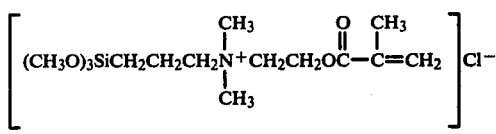

which is outside of the scope of the instant invention. The properties of the test slabs were measured and are recorded in Table II.

The acryloxyalkylsilanes encompassed by the instant invention were more efficient than other tested silanes. The tensile strength of a test slab had higher values when the silanes of the instant invention were added to the mixture of base, extending filler, and catalyst, as compared to other tested silanes.

TABLE II

| Sample | Silane* | Amount Part | Durometer | Tensile Strength MPa | Elongation % |
|---|---|---|---|---|---|
| J | 1 | 0.1 | 59 | 6.48 | 240 |
| K | 2 | 0.1 | 59 | 5.99 | 260 |
| L | 3 | 0.1 | 58 | 5.17 | 270 |
| M** | 4 | 0.1 | 59 | 4.34 | 300 |
| N** | 5 | 0.2 | 59 | 3.79 | 420 |
| Control | — | — | 59 | 3.29 | 350 |

*Silane
1 Gamma-methacryloxypropyltrimethoxysilane.
2 Gamma-methacryloxypropyl(methyl)dimethoxysilane.
3 Gamma-methacryloxypropyl(dimethyl)acetoxysilane.
4 Beta(vinyl phenyl)ethyltrimethoxysilane.
5 Reaction product of chloropropyltrimethoxysilane and dimethylaminoethylmethacrylate, 50 weight percent in solvent.
**For comparative purposes.

EXAMPLE 3

Another series of stocks were made using different silanes to illustrate the superior efficiency of the instant invention.

Each stock was compounded as in Example 1, E. using 100 parts of the silicone rubber base of A, 100 parts of ground quartz of C, 1 part of vulcanizing agent of A, and the amount and type of silane shown in Table III.

Each stock was then molded into test slabs using the procedure of Example 1 and the physical properties measured as described in Example 1. The properties measured are recorded in Table III.

A comparison of the results in Table III shows that the silane of the instant invention is more efficient than the silanes not covered by the instant invention. The tensile strength of the test slabs containing the silane of the instant invention is higher than the tensile strength of the test slabs made using comparative silanes when each silane is used at the 0.1 part level.

TABLE III

| Sample | Silane | Amount | Durometer | Tensile Strength MPa | Elongation % | Tear Strength kN/m |
|---|---|---|---|---|---|---|
| O  | 1 | 0.1 | 60 | 6.79 | 240 | 10.7 |
| P* | 2 | 0.1 | 60 | 5.04 | 310 | 13.1 |
| Q* | 3 | 0.1 | 61 | 5.41 | 260 | 13.5 |
| R* | 4 | 0.1 | 60 | 5.07 | 240 | 15.4 |

1 Gamma-methacryloxypropyltrimethoxysilane.
2 Vinyltriacetoxysilane.
3 Vinyltris($\beta$-methoxyethoxy)silane.
4 Vinyltrimethoxysilane
*For comparative purposes.

EXAMPLE 4

A series of stocks were made using different types of extending filler. The amount of filler used was that expected to produce a 50 to 60 durometer silicone rubber after vulcanizing.

i. Stock was compounded consisting of 100 parts of silicone rubber base of A, 0.1 part of gamma-methacryloxypropyltrimethoxysilane, 1 part of vulcanizing agent A, and 100 parts of ground quartz.

The stock was molded, cured, and tested as described in Example 1. The properties measured are recorded in Table IV.

ii. The stock of i was prepared using 60 parts of diatomaceous earth in place of the ground quartz and 0.2 part of the silane.

The following samples were for comparative purposes.

iii. The stock of i was prepared using 100 parts of calcium carbonate in place of the ground quartz.

iv. The stock of iii was prepared using a different calcium carbonate.

v. The stock of iv was prepared using no silane.

vi. The press-cured slab of v was oven-cured for 1 hour at 150° C. and retested.

vii. The stock of i was prepared using 50 parts of ground clay in place of the ground quartz.

viii. The stock of vii was prepared using a different ground clay.

ix. The stock of viii was prepared using no silane.

x. The press-cured slab of ix was ovencured for 1 hour at 150° C. and retested.

A comparison of the results in Table IV show that the quartz and diatomaceous earth extending fillers give the highest tensile strengths.

EXAMPLE 5

A series of samples were made to illustrate the use of a different type of organic peroxide vulcanizing agent, and its interaction with the type of polydiorganosiloxane used.

a. A silicone rubber base was prepared by mixing 100 parts of hydroxyl endblocked polydimethylsiloxane with a Williams Plasticity Number of about 150, with 25 parts of reinforcing fume silica with a surface area of 250 m²/g. The Williams Plasticity Number was determined using the procedure of ASTM-D926 with a sample weight of 4 times the specific gravity of the polydimethylsiloxane of 0.98. The base also had 7.5 parts of a hydroxyl endblocked polydisiloxane fluid with a viscosity of about 0.042 Pa·s added to prevent the base from crepe aging.

The silicone rubber base was then compounded into an uncatalyzed stock by mixing 100 parts of base with 100 parts of ground quartz with an average particle size of 5 micrometers on a 2 roll mill. Portions of the uncatalyzed stock were then mixed with gamma-methacryloxypropyltrimethoxysilane in the amounts shown in Table V, based on 100 parts of base. The first two portions were catalyzed with 1.0 part of a vinyl specific organic peroxide vulcanizing agent consisting of 50 percent by weight 2,5-bis(tert-butylperoxy)-2,5-dimethylhexane dispersed on an inert carrier powder. Two more portions were catalyzed with 1.3 parts of a non-vinyl specific vulcanizing agent consisting of 50 percent by weight of 2,4-dichlorobenzoylperoxide dispersed in an inert fluid. The catalyzed portions were molded into test slabs as described in Example 1, then tested as described in Example 1. The results of the tests were as shown in Table V.

The results show that when a vinyl specific vulcanizing agent is used with a non-vinyl containing polydiorganosiloxane the composition does not cure. When a non-vinyl specific vulcanizing agent is used with a non-vinyl containing polydiorganosiloxane, the composition does cure. The results further show that the addition of the gamma-methacryloxypropyltrimethoxysilane in the composition with the non-vinyl polymer and vinyl specific vulcanizing agent does not aid the curing process. When the non-vinyl containing polydiorganosiloxane and the non-vinyl specific vulcanizing agent are used with the gamma-methacryloxypropyltrimethoxysilane, the tensile strength is significantly improved over that obtained without the silane.

b. The silicone rubber base of Example 1, A was compounded into an uncatalyzed stock in the same manner as the base in (a). Portions of the uncatalyzed

TABLE IV

| Sample | Filler | Amount Of Filler Parts | Amount Of Silane Parts | Durometer | Tensile Strength MPa | Elongation % |
|---|---|---|---|---|---|---|
| i. | Ground Quartz | 100 | 0.1 | 62 | 6.75 | 200 |
| ii. | Diatomaceous Earth | 60 | 0.2 | 70 | 7.27 | 150 |
| iii.* | Calcium Carbonate | 100 | 0.1 | 57 | 3.93 | 500 |
| iv.* | Calcium Carbonate | 100 | 0.1 | 55 | 3.58 | 470 |
| v.* | Calcium Carbonate | 100 | — | 50 | 3.24 | 490 |
| vi.* pc | Calcium Carbonate | 100 | — | 53 | 3.38 | 490 |
| vii.* | Clay | 50 | 0.1 | 65 | 3.82 | 210 |
| viii.* | Clay | 50 | 0.1 | 37 | 3.79 | 520 |
| ix.* | Clay | 50 | — | Did Not Cure Properly | | |
| x.* pc | Clay | 50 | — | 25 | 2.69 | 750 | pc = Oven post-cured for 1 hour at 150° C.
*For Comparative purposes.

stock were then mixed using the amount of silane and the two vulcanizing agents as specified in Table V. The catalyzed portions were molded into test slabs as described in Example 1, then tested as described in Example 1. The results of the tests were as shown in Table V.

The results of these tests show that when a polydiorganosiloxane contains vinyl radicals, it can be vulcanized with either a non-vinyl specific or a vinyl specific vulcanizing agent. The results further show that in both cases the addition of gamma-methacryloxypropyltrimethoxysilane significantly improved the tensile strength over that of the samples without the addition of the silane.

TABLE V

| Sample | Polymer Type | Amount of Silane | Vulcanizing Agent | Durometer | Tensile Stength MPa | Elongation % |
|---|---|---|---|---|---|---|
| a-1 | non-vinyl | — | vinyl specific | Did Not Cure | | |
| a-2 | non-vinyl | 0.1 | vinyl specific | Did Not Cure | | |
| a-4 | non-vinyl | — | non-vinyl specific | 41 | 3.93 | 420 |
| a-5 | non-vinyl | 0.1 | non-vinyl specific | 45 | 5.24 | 270 |
| b-1 | vinyl | — | non-vinyl specific | 56 | 3.51 | 350 |
| b-2 | vinyl | 0.1 | non-vinyl specific | 59 | 6.41 | 190 |
| D | vinyl | — | vinyl specific | 59 | 4.34 | 240 |
| E | vinyl | 0.1 | vinyl specific | 60 | 6.79 | 240 |

This which is claimed is:

1. A composition comprising
   (a) 100 parts by weight of silicone rubber base consisting essentially of polydiorganosiloxane wherein the organic radicals are selected from the group consisting of methyl, vinyl, phenyl, and 3,3,3-trifluoropropyl, reinforcing silica filler, and anti-crepe hardening agent,
   (b) from 25 to 300 parts by weight of siliceous extending filler with an average particle size of less than 25 micrometers and a surface area of less than 50 m²/g.,
   (c) from 0.1 to 5 parts by weight of organic peroxide vulcanizing agent suitable for vulcanizing the silicone rubber base,
   (d) from 0.08 to 0.3 part by weight of an acryloxyalkylsilane of the formula

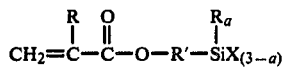

in which R is selected from the group consisting of hydrogen and methyl radical, R' is an alkylene radical of from 1 to 4 inclusive carbon atoms, X is a radical selected from the group consisting of lower alkoxy radicals of from 1 to 3 inclusive carbon atoms and acetoxy radical, and a is from 0 to 2 inclusive.

2. The composition of claim 1 in which the siliceous extending filler, (b), is selected from the group consisting of ground quartz and diatomaceous earth, the organic peroxide, (c), is present in an amount of from 0.5 to 2.0 parts by weight, and the acryloxyalkylsilane, (d), is gamma-methacryloxypropyltrimethoxysilane.

3. The composition in accordance with claim 1 in which the silicone rubber base (a) consists essentially of 100 parts by weight of a polydiorganosiloxane having methyl and vinyl radicals wherein the vinyl radicals are present in an amount of from 0.05 to 0.5 mole percent based on the total number of methyl and vinyl radicals, and 15 to 75 parts by weight of a reinforcing silica filler.

4. The composition of claim 3 in which the siliceous extending filler of (b) is selected from the group consisting of ground quartz and diatomaceous earth, the organic peroxide of (c) is present in an amount of from 0.5 to 2.0 parts by weight and the acryloxyalkylsilane of (d) is gamma-methacryloxypropyltrimethoxysilane.

5. Silicone rubber obtained by heating the composition of claim 1 above the activation temperature of the organic peroxide.

6. Silicone rubber obtained by heating the composition of claim 2 above the activation temperature of the organic peroxide.

7. A silicone rubber obtained by heating the composition of claim 3 above the activation temperature of the organic peroxide.

8. A silicone rubber obtained by heating the composition of claim 4 above the activation temperature of the organic peroxide.